US010549737B2

(12) United States Patent
Leiber et al.

(10) Patent No.: US 10,549,737 B2
(45) Date of Patent: Feb. 4, 2020

(54) ACTUATING DEVICE FOR A MOTOR VEHICLE BRAKE

(71) Applicant: IPGATE AG, Pfäffikon (CH)

(72) Inventors: Heinz Leiber, Oberriexingen (DE); Carsten Hecker, Munich (DE); Thomas Leiber, Munich (DE)

(73) Assignee: IPGATE AG, Pfäffikon (CH)

( * ) Notice: Subject to any disclaimer, the term of this patent is extended or adjusted under 35 U.S.C. 154(b) by 0 days.

(21) Appl. No.: 15/559,779

(22) PCT Filed: Mar. 14, 2016

(86) PCT No.: PCT/EP2016/055470
§ 371 (c)(1),
(2) Date: Sep. 19, 2017

(87) PCT Pub. No.: WO2016/150745
PCT Pub. Date: Sep. 29, 2016

(65) Prior Publication Data
US 2018/0065605 A1 Mar. 8, 2018

(30) Foreign Application Priority Data
Mar. 20, 2015 (DE) .......................... 10 2015 104 246

(51) Int. Cl.
 *B60T 8/36* (2006.01)
 *B60T 7/04* (2006.01)
 (Continued)

(52) U.S. Cl.
 CPC .............. *B60T 8/368* (2013.01); *B60T 7/042* (2013.01); *B60T 13/145* (2013.01); *B60T 13/686* (2013.01); *B60T 13/745* (2013.01)

(58) Field of Classification Search
 CPC ........ B60T 8/368; B60T 13/686; B60T 7/042; B60T 13/745; B60T 13/66; B60T 8/4081; B60T 2220/04; B60T 13/145
 (Continued)

(56) References Cited

U.S. PATENT DOCUMENTS 9,446,753 B2 * 9/2016 Feigel .................... B60T 7/042
2011/0115282 A1 * 5/2011 Dinkel ................... B60T 7/042
                                                              303/3
(Continued)

FOREIGN PATENT DOCUMENTS

DE     102011017436 A1    10/2012
DE     102011101655 A1    11/2012
(Continued)

OTHER PUBLICATIONS

Int'l Search Report dated May 20, 2016 in Int'l Application No. PCT/EP2016/055471.
(Continued)

*Primary Examiner* — Pamela Rodriguez
(74) *Attorney, Agent, or Firm* — Panitch Schwarze Belisario & Nadel LLP

(57) ABSTRACT

An actuating device for a motor vehicle brake may include an actuating apparatus, such as a brake pedal; a pressure-supply device, such as a single- or double-stroke piston pump, which may be driven by an electromotive drive; a piston-cylinder unit actuable by the actuating apparatus, hydraulically connected to a pressure medium reservoir, and forming at least two pressure spaces connected to hydraulic brake circuits; a valve arrangement having valves for wheel-specific adjustment of brake pressures and for connecting/disconnecting the wheel brakes to/from the pressure-supply device and/or the piston-cylinder unit; and an electronic control unit. An axis of the piston-cylinder unit and an axis
(Continued)

of the piston pump may be arranged transversely with respect to each other. The piston-cylinder unit and the pressure supply unit may be arranged in a first housing, and the electromotive drive, the first housing, the valve arrangement, and the electronic control unit may be stacked.

31 Claims, 8 Drawing Sheets

(51) Int. Cl.
    *B60T 13/14*     (2006.01)
    *B60T 13/68*     (2006.01)
    *B60T 13/74*     (2006.01)

(58) Field of Classification Search
    USPC .......... 303/119.3, 119.1, 119.2, 113.4, 3, 16
    See application file for complete search history.

(56) References Cited

U.S. PATENT DOCUMENTS

| | | | |
|---|---|---|---|
| 2014/0216866 A1* | 8/2014 | Feigel | B60T 7/042 188/156 |
| 2016/0016567 A1* | 1/2016 | Jurgens | B60T 7/042 303/10 |

FOREIGN PATENT DOCUMENTS

| | | |
|---|---|---|
| DE | 102011050869 A1 | 12/2012 |
| DE | 102012213216 A1 | 2/2013 |
| DE | 102013202350 A1 | 8/2014 |
| DE | 102014218034 A1 | 4/2015 |
| DE | 102014109628 A1 | 1/2016 |
| DE | 102014214095 A1 | 1/2016 |
| DE | 102014117726 A1 | 6/2016 |
| DE | 102015104246 A1 | 9/2016 |
| WO | 0247947 A1 | 6/2002 |

OTHER PUBLICATIONS

Written Opinion dated May 20, 2016 in Int'l Application No. PCT/EP2016/055471.
Int'l Preliminary Report on Patentability dated Sep. 26, 2017 in Int'l Application No. PCT/EP2016/055471.
Int'l Preliminary Report on Patentability dated Sep. 26, 2017 in Int'l Application No. PCT/EP2016/055470.
Int'l Search Report dated Jun. 3, 2016 in Int'l Application No. PCT/EP2016/055470.
Written Opinion dated Jun. 3, 2016 in Int'l Application No. PCT/EP2016/055470.

* cited by examiner

ACTUATING DEVICE FOR A MOTOR VEHICLE BRAKE

CROSS-REFERENCE TO RELATED APPLICATION

This application is a Section 371 of International Application No. PCT/EP2016/055470, filed Mar. 14, 2016, which was published in the German language on Sep. 29, 2016 under International Publication No. WO 2016/150745 A1, which claims priority under 35 U.S.C. § 119(b) to German Patent Application No. 10 2015 104 246.0, filed Mar. 20, 2015, the disclosures of which are incorporated herein by reference in their entireties.

DESIGNATION

The present invention relates to a motor vehicle brake.

PRIOR ART

In view of the many new automaker systems (OEM), the installation of aggregate units, in particular in motor compartments or aggregate spaces, is facing ever greater problems due to tight installation spaces. In some instances ABS aggregate units e.g. in particular in front-wheel drive and transverse motor vehicles, are arranged behind the motor, which means that when the ABS aggregate unit is replaced the motor has to be removed.

Therefore, there is demand from OEM to reduce the size of existing aggregate units or to design new units as compactly as possible. It should also be added that there exists right-hand drive and left-hand drive, which in aggregate brake units means that the packaging should be the same.

Many aggregate units have electrical functions and sensors, which often require a plurality of plugs, which in particular requires a lot of installation time.

Furthermore, the demand for crash safety is growing ever greater, which has the consequence that the installation lengths in systems in aggregate spaces should be as short as possible, in particular if these are mounted in the bulkhead. It is known that there is a marked trend in brake systems to switch from the current, customary so-called "3-box solutions", in which brake servos, ABS/ESP aggregate units, and vacuum pumps form different assembly units, which in particular could also be spatially separated, to integrated "1-box solutions", in which all components, such as pressure supply, hydraulic (valve) unit (HCU), control unit (ECU) and master cylinder are integrated in one assembly unit. Such a compact "1-box brake system" is described for example in DE 10 2012 213 216.

A pinion gear drive of the motor target as a sensor for the electronic drive motor is described in DE 10 2011 017 436. Here the sensor element is arranged in a sensor module which is connected to the printed circuit board via a plug connection. Additionally, redundant pedal stroke sensors and a sensor for monitoring the fill level in the brake fluid reservoir are required.

In a brake system described in DE 10 2012 213 216 a first cylinder-piston arrangement actuated by the vehicle operator, a pressure-feeding device and a valve arrangement are arranged in the same housing, wherein the axis of the electric motor of the pressure-feeding device is substantially arranged perpendicular to the longitudinal axis of the first cylinder-piston arrangement. With this solution a certain compactness is already sought, although this can be further improved; in particular DE 10 2012 213 216 is designed for the spatial constraints of a round contour of conventional vacuum boosters and does not consider the packaging optimisation as a whole in the motor vehicle. For optimal packaging, a rectangular design is more expedient than a round contour. In addition, adaptability to different installation situations is in particular to be desired, such as e.g. installation in the motor compartment (so-called "front-bolted").

Further requirements include:
- good accessibility for assembling the brake lines to the wheel brakes
- dto. for plugs in particular of the main wiring harness and short cable lengths to the vehicle distributor box (central electrics)
- good ventability, not only in final assembly (with vacuum), but also in service (venting through pedal actuation)
- short conductive paths of the power cables from the plug to the power unit of the motor control
- good cooling and heat dissipation of the power unit (power amplifiers, MOSFET and driver)
- Noise-reduction from the drive and solenoid valves as well as the structure-borne noise transmission to the bulkhead

Object of the Invention

The object of the present invention is therefore to create a brake actuating system which is as compact, weight-saving and cost-effective as possible, which is also adaptable for various motor vehicles and/or installation situations.

Achieving the Object

The object of the invention may be achieved through the features found in the various claims.

A brake actuating device is created with the solution according to the invention which is compact, weight-saving and cost-efficient and is also adaptable for various motor vehicles and/or installation situations. In addition, a 1-box solution is created which meets the following requirements and comprises the following advantages:
- short installation length and optimal usable geometry for other components in the motor vehicle, in particular through its rectangular general shape and flexible plug positioning;
- largely symmetrical configuration for left-hand drive (LL) and right-hand drive (RL);
- good accessibility of the hydraulic and electrical connections for the assembly
- mounting to the end wall (bulkhead) of the motor vehicle should be possible from both the motor (front-bolted) and from the foot well;
- as low cost and weight as possible;
- modular for different configuration levels, e.g. autonomous driving;
- high level of fault-security;
- good ventability;
- good cooling and heat dissipation from PCB to the housing unit with high thermal capacity;
- reduction of noise level through low structure-borne noise in the passenger compartment;
- good handling with assembly and venting, good cooling of the ECU and low noise level;
- Installation is optimised in one packaging for all components in the motor vehicle as a whole.

The invention is advantageously characterised in that the axis of the piston-cylinder unit and the axis of the piston pump or double-stroke piston pump of the pressure supply device are arranged transverse in relation to each other, wherein the piston-cylinder unit and the pressure supply unit are arranged in a first housing, wherein the motor, the first housing, the valve arrangement and the electronic control unit are arranged stacked one on top of the other, and in that the axis of the piston-cylinder unit is arranged transverse in relation to the stacking direction and the axis of the pressure supply device is arranged parallel to the stacking direction, wherein the stacking direction is arranged parallel to the vertical or at an angle φ of 5° to 30° to the vertical. This advantageous arrangement ensures a particularly slim construction so that the actuating device according to the invention is very short in construction and is arranged to save space in the motor compartment and can furthermore be used in left-hand drive and right-hand drive motor vehicles.

Thus it is possible that the motor is arranged above or below. The sequence of motor, first housing, valve arrangement, and control unit should be respected. In doing so it is quite possible that at least one part of the control unit are arranged laterally next to the pressure supply device, the piston-cylinder unit and/or the valve arrangement and extends laterally beyond at least one of the aforementioned components and/or housing.

Thus, according to the invention it is possible that the valves in the valve arrangement are arranged in a second housing or in the first housing. Thereby further valves, in particular solenoid valves and pressure sensors can be arranged in the second housing.

It is particularly advantageous if the housings in which the piston-cylinder unit, the pressure supply unit, the valves in the valve arrangement and the control and regulating device have a height together which is 2 to 4 times as large as the width of the housings. This ensures a slim construction which saves space and construction effort in the motor compartment.

A particularly advantageous embodiment of the aforedescribed actuating device can be achieved if the housings in which the piston-cylinder unit, the pressure supply unit, the valves in the valve arrangement, and the control unit control unitare arranged, together form a flat side wall which is arranged facing, in particular parallel to, at least one electronic component of the vehicle, in particular the vehicle battery.

An advantageous further development of both possible embodiments described above is achieved if the housings together in cross-section comprise a substantially rectangular form, wherein the cross-section plane runs parallel to the level of the bulkhead of the motor compartment. A very space-saving housing form is achieved through the rectangular construction with a height which is 2 to 4 times as large as the width of the rectangle. The greatest possible usable uniform space, as well as a rectangular additional space between the brake system and electrical components, such as e.g. the battery, as presented for example in FIG. 6, is advantageously achieved through the substantially rectangular cross-sectional plane of the outer contour of the front view on the motor vehicle bulkhead with vertical arrangement of the main components, motor, first housing, valve arrangement, actuating piston, pressure supply unit, solenoid valve, and control unit.

In all aforedescribed embodiments the piston pump or double-stroke piston pump of the pressure supply device can either be completely in the first housing or also partially extend out from the first housing into the second housing of the valve arrangement. Thereby it is also possible that the solenoid valves extend in a manner parallel to the end region of the piston or double-stroke piston pump.

A small construction can advantageously be realised if the axes of at least certain or all of the solenoid valve armatures in the valve arrangement are arranged parallel to or at an angle of less than 45° with respect to the stacking direction and the axis of the piston pump or double-stroke piston pump of the pressure supply device.

It is further possible that the housing containing the control and regulating device is arranged completely above or below the valve arrangement; however, it is also possible that the housing in cross-section is L-shaped or U-shaped and partially extends above or below the valve arrangement and additionally extends parallel to the stacking direction along at least the valve arrangement.

The reservoir vessel can also either be arranged completely above, completely next to or above and laterally next to the stack and the housings.

It is also possible that the armature of at least certain of or all solenoid valves in the valve arrangement extend into the control unit, wherein the armatures are encompassed by coils arranged in the control unit. This achieves a reduction in cables required.

Thus, can the control unit be arranged in a further third housing unit which sits directly on the second housing and is connected to it.

The first housing, which essentially receives all THZ pistons, pressure supply pistons and pumps, advantageously comprises a mounting flange for mounting on the bulkhead and pedal interface with pedal sensor actuator. The first housing is preferably manufactured using die-casting or continuous casting and reworked for the piston guide of the pressure supply unit and of the actuating piston of the brake pedal unit.

For reinforcement, the second housing, which in particular receives the valve arrangement with its solenoid valves, non-return valves, panels and pressure sensors, is caulked or pressed in particular with well-flowable material, e.g. aluminium. The second housing can also optionally contain a part of the pressure supply piston.

The first housing unit and the second housing unit can also be realised as one part or the two housing parts can also be connected in a joining process preferably before the machining of the piston cylinder guides.

The motor is fixed to the first housing and can optionally be installed at a forward-tilting angle. It is connected in particular by means of a gear which is arranged in the first housing or integral part of the motors, to a pump, preferably a piston pump or double-stroke piston pump.

The reservoir vessel is advantageously laterally attached to the stack or alternatively sits above the stack or motor and comprises these and is preferably connected to the suction inlet of the pump.

In a possible embodiment in which the motor is arranged at the top of the stack, the reservoir vessel encases the motor and extends laterally vertically downwards to the first housing part so that the reservoir vessel can be directly connected to the pressure supply unit.

It is advantageous if the sensor actuators, which convey the movement of the pedal and the rotor to a rotatable target (e.g. solenoid) are housed in the first, second or both housings, wherein the sensor element is positioned directly on the printed circuit board is connected to it. Thereby no additional connections, plug connectors or printed circuit boards (PCB) are required for protective and evaluation elements, e.g. Hall elements.

At least a sensor element is also connected to the printed circuit board or arranged on the printed circuit board which measures the fluid level in the reservoir vessel.

An electrical connection element (plug) to the on-board supply system is flexible positionable and depending on the installation situation is either laterally, see FIG. 2, 8, 10, or frontally, see FIG. 7, mounted to the control unit (ECU). This is particularly advantageous, as the positioning of the plug additionally creates installation volume in the aggregate space. The installation length can be optimised through a lateral arrangement, e.g. with respect to crash requirements, through frontal arrangement the distance to electronics/electrical assembly units, such as e.g. batteries, electrical control units, etc. can be optimised, as E/E assembly units also comprise a rectangular assembly contour.

The hydraulic connection cables to the wheel brakes are mounted on the front of the front side from the perspective of the vehicle compartment and are therefore well adaptable for left-hand drive LL and right-hand drive RL and allow easy fitting tools.

Any possible leakage through seals can be collected by a motor housing or leakage housing which is extended in the lower part and sensed via an electrode. In the case of the latter it is assumed that the level sensor of the brake fluid reservoir vessel is responsive at a determined leakage volume.

Good ventilation of the master brake cylinder (actuation via brake pedal) in particular for operation in fallback level is important as in normal operation less good ventilation is compensated by the control of the pressure supply. Furthermore, good ventilation of the solenoid valve is necessary for PWM operation as this affects the attenuation of the armature movement. For this purpose it is necessary that the connection outputs of the wheel brake wires are higher than the solenoid valve. Thereby standing solenoid valves below the valve block as shown in FIG. 10 provides the best conditions.

The position of the power units on the PCB has a cost-driving effect in the event of unfavourable implementation. However, positioning directly next to the plug and contacting to the motor in the same area is advantageous.

The control of the motor generates a power loss in the power unit (MOSFET and driver). A heat dissipation to the housing unit is advantageously and inexpensively achievable. As the brake operation lasts for a relatively short amount of time, a large heat capacity is sufficient for heat dissipation.

During operation, body vibration is generated by the motor bearings, KGT and actuation of the solenoid valves. For this purpose it is provided that the motor is connected to the housing unit via a damping plastic housing. The housing unit is in turn connected to the bulkhead by means of a separated plastic flange. A further improvement is envisaged through storage of the flange in damping material (e.g. elastomers) in an adapter part of the bulkhead.

Possible embodiments of the actuating device according to the invention are described in more detail below with reference to the drawings.

Figure 1:
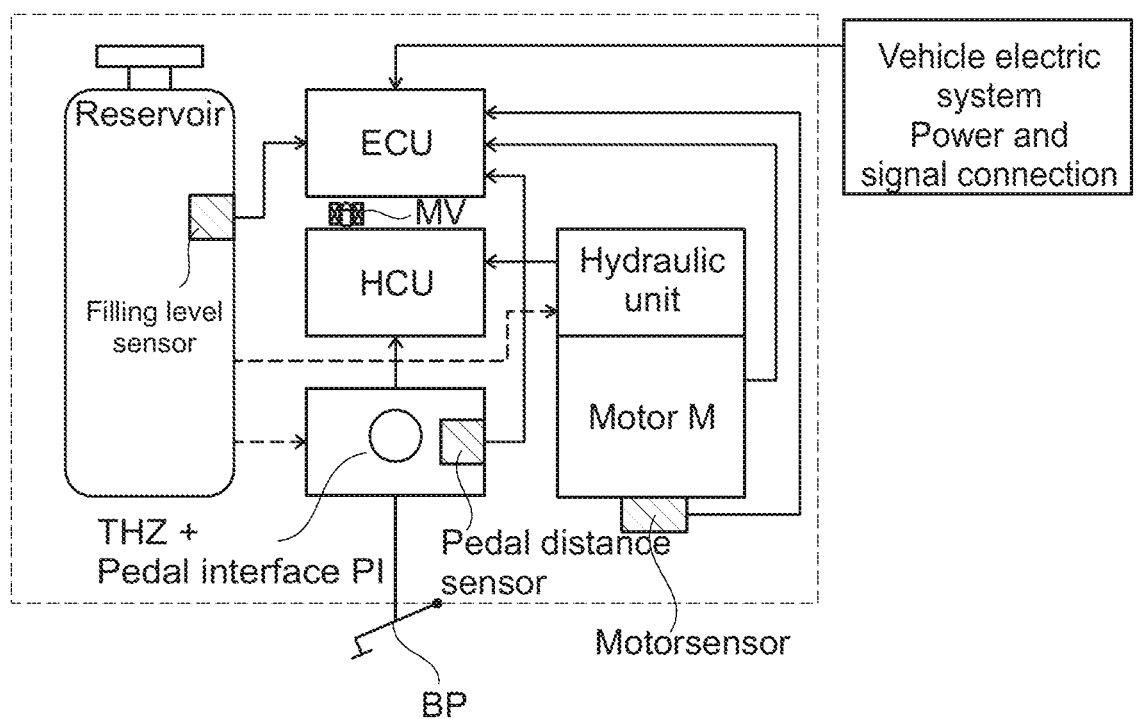
FIG. 1 shows a schematic view of an actuating device for a brake system for a motor vehicle.

FIG. 1 shows the essential structuring in an interface circuit and also the interaction of the essential components of the actuating device according to the invention, beginning with the brake pedal, which works on the THZ piston via the pedal interface and additionally is connected to the actuator of the pedal stroke sensors. As is known, two pedal stroke sensors are used for a safety-relevant system. A further integral part is the hydraulic valve arrangement and unit HCU, which comprises a large proportion of the valves, in particular solenoid valves MV and pressure sensors. This is connected to the electrical control unit ECU, which according to the preferred technique also comprises the solenoid coils of the solenoid valves with their housing. The control device ECU is screwed to the hydraulic unit HCU in the second housing via seals. The control unit ECU is connected to the sensors and the motor, in which the electrical connection is achieved within the 1-box. A connection to the electrical system is necessary for the supply of voltage/power, wherein this is predominantly redundantly designed and additionally comprises control and communication signals and connections. The pressure supply is an important component which is driven by the E-motor. Corresponding to the piston pumps, circulating pumps, such as geared pumps are also conceivable, as for example described in the applicant's DE 10 2014 117 726, FIG. 2a, to which reference is made here.

The hydraulic system must be provided with fluidity, which is stored in a reservoir or reservoir vessel and of which the fill level is monitored by a sensor.

Figure 2:
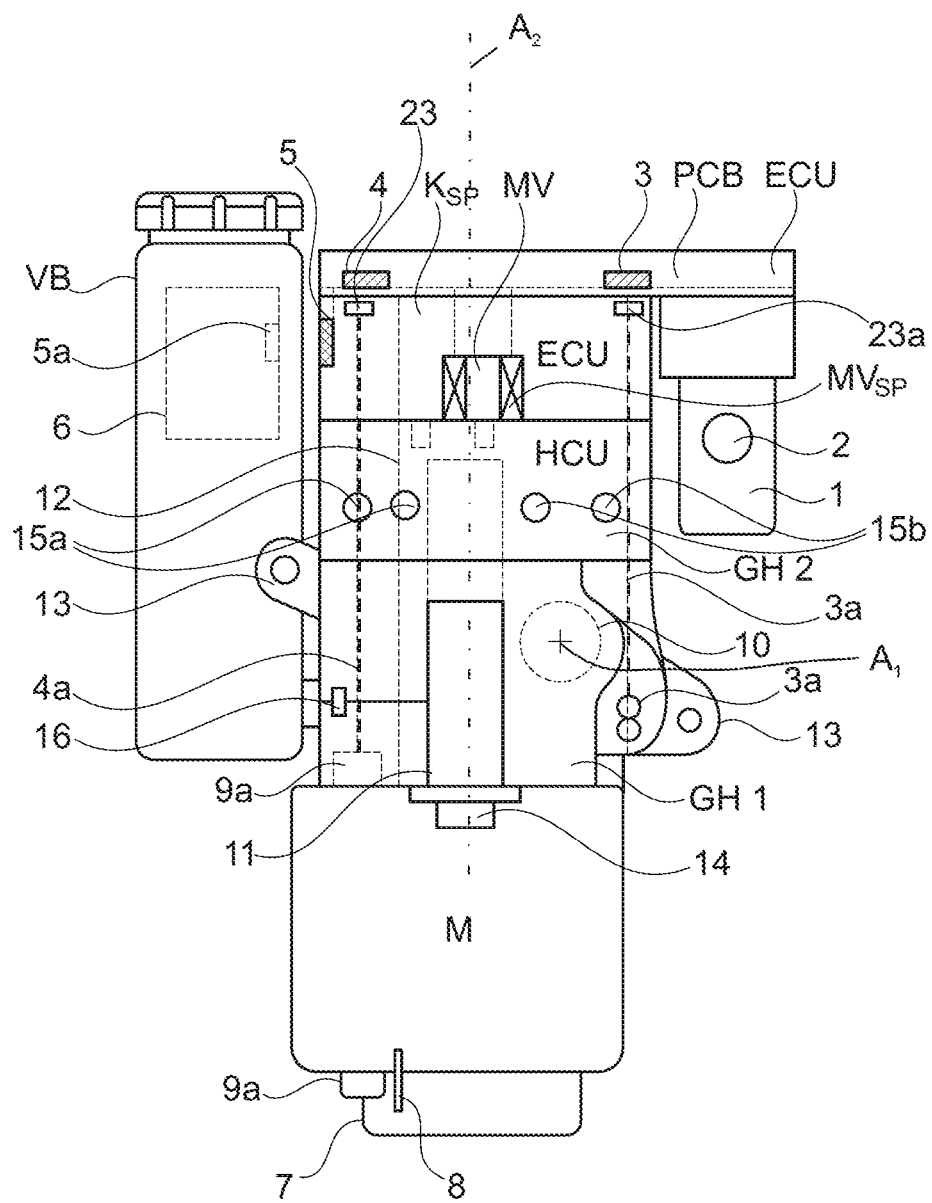
FIG. 2 shows a front view of the brake system with the setup of the main components.

FIG. 2 shows the basic structure of the actuating device and its main components in a front view facing towards the bulkhead.

The motor M is connected to a first housing unit GH1 via the mount 14 from below. In the said housing unit, the motor-driven pump 11 is housed with suction valves 16 which are connected to the reservoir vessel VB. The possible pump embodiments are described in the aforementioned DE 10 2014 109 628, FIG. 2, and DE 10 2014 117 726, FIG. 2. The pressure supply pistons with the associated pressure supply cylinder can either be arranged in only one housing GH1 or can alternatively also extend into the housing unit GH2. An assembly of pressure supply pistons in the housings GH1 and GH2 can be used to optimise the installation height, in particular in brake systems with few solenoid valves, such as is the case in e.g. multiplex system architecture. The pressure supply device can also extend into the second housing GH2 in a pressure supply composition with a long piston guide, such as e.g. pressure supply compositions set up as stepped pistons, pistons with a small diameter and large strokes. In an arrangement in both housings GH1 and GH2, during assembly the separately finished housing parts GH1 and GH2 are connected together in a form-fitting manner by means of clamping or welding, or in a force-fitting manner through screws, wherein a corresponding seal of the hydraulic connection between the housing parts 1, e.g.

connections from THZ and pressure supply to HCU, must be provided. In such a configuration the two housings GH1 and GH2 can also be arranged as a single housing GH.

The housings GH1, GH2 and ECU as well as the motor M are stacked one on top of the other in the stacking direction SR. The pressure supply device 11 is arranged parallel in relation to the stacking direction, whereas the piston-cylinder unit 10 is arranged transversely with respect to the stacking direction SR.

Where the pressure supply device extends into the second housing GH2, the connections 15a, 15b to the wheel brake cylinders are conveniently arranged on the left and right of the housing GH2. The good accessibility of the front-end connections to the wheel brake cylinders is also of great importance. This is a great advantage for left-drive LL and right-drive RL motor vehicles, whereby the assembly time and tooling effort is reduced. The housing units GH1 and GH2 are characterised in that the hydraulic functions are arranged in these units. The ECU can in fact be designated as a third housing unit, but it contains the solenoid coils and therefore functionally belongs to the HCU.

Various moving pistons are housed in this housing GH1, the material of which may cause little wear on the pistons by providing good sliding properties. Silicon-containing aluminium or special plastic is predominantly used here.

The longitudinal axis $A_1$ of the piston-cylinder unit 10 runs perpendicular to the drawing level. The axis $A_2$ of the piston pump or double-stroke piston pump of the pressure supply device 11 is arranged perpendicular to the longitudinal axis $A_1$.

On the first housing GH1 there is a mounting flange 13 integrated for mounting to the bulkhead which is also accessible from the motor compartment which makes a so-called front-bolted mounting possible. For this purpose a corresponding recess for the mounting tool is provided on the side of the reservoir or reservoir vessel VB.

In contrast to this, the second flange-mounted housing unit GH2 (also referred to as HCU) for mounting the solenoid valve MV and the pressure sensor should be made from a soft, flowable aluminium which means that a highly pressure-resistant mounting of the solenoid valve MV and pressure sensor is possible by means of the associated forming. The drive of one or two mechanical sensor actuating mechanisms 3a is also advantageously mounted in the second housing GH2 which is e.g. connected to the ECU via redirection of a gear rack (see FIG. 5a), wherein the sensor target 23a is positioned directly close to the ECU. The evaluation element 3 of the sensor is placed on the PCB. This mechanism is preferably used for the position direction of the pedal stroke.

A similar mechanism is provided for the motor angle sensor. The drive of the motor rotation angle target is achieved through a drive 9a. For this to be achieved it is mechanically guided to the PCB in the same way as the pedal stroke sensor and the sensor target 23 is positioned close to the circuit board. The evaluation element 4 is arranged on the PCB (see FIG. 4).

Figure 5A:
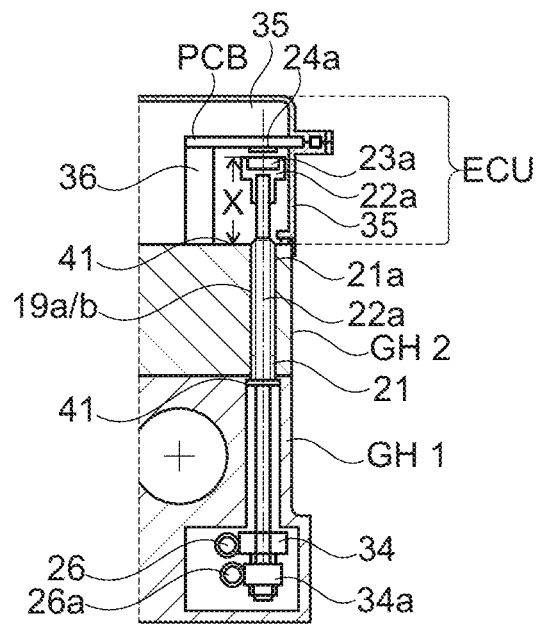
FIG. 5a shows a pedal stroke sensor to the target.

The control unit ECU is sealed on the second housing GH2 with the described solenoid coils and contacts for the pressure sensor and a plurality of connection to the motor corresponding to the motor control centre. A connection element 1 (main plug) with wiring set 2 sits laterally or on the front of the electrical system. Among other electrical components, the sensor evaluation elements for the double sensing of the pedal stroke 3, of the motor rotation angle 4 and of the fill level 5 are electrically connected on the printed circuit board (PCB). The usual peripheral wiring, i.e. the components for the conversion of the Hall signal to I/O (input/output) of the microcontroller and possible suppressor circuit of the sensor elements are also taken into account. This eliminates the need for additional sensor circuit boards and electrical connection lines which in addition to the cost savings also results in a lower outage rate. As shown in FIG. 5a, good heat dissipation of the MOSFET from the motor control unit from the printed circuit board PCB to the second housing is also possible.

An electrode 8 in a housing extension 7 is mounted on the underside of the motor housing, which detects the steering flow from the piston. These are directed e.g. from the piston to a bowl on the spindle and downward through a spindle bore.

Figure 3:
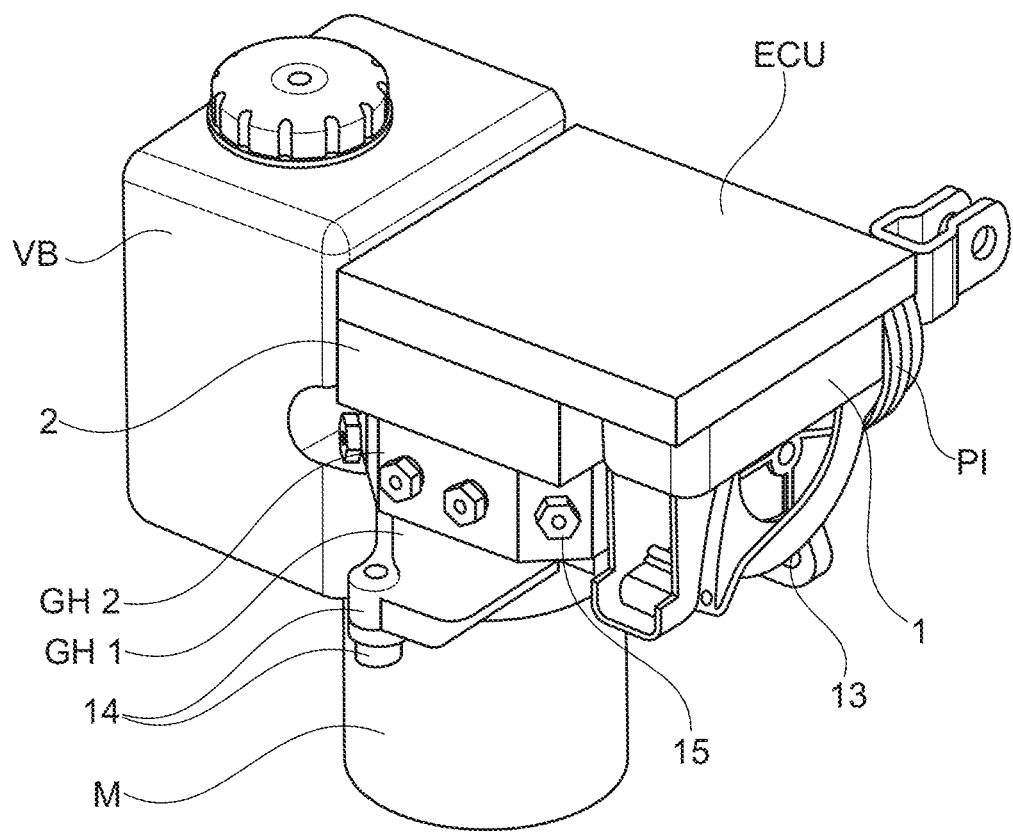
FIG. 3 shows a right-perspective view of the brake system with electrical plug connector.

FIG. 3 shows a perspective view of FIG. 2. Here all of the essential elements can be seen, such as the motor mount, reservoir VB, housing arrangement, as well as the rear flange 13 for mounting on the end wall, which is integrated with the first housing GH1. In addition, the pedal interface PI is shown, which extends from the first housing into the foot space is shown in detail in FIG. 5. Here the compact design with considerable assembly volume savings can clearly be seen. In particular, the rectangular assembly offers optimal installation requirements, as automakers require as great a distance as possible between the brake unit and the adjacent electrical components, such as e.g. the battery or electrical control devices. This is in contrast to a round installation contour, which is the usual installation contour of existing brake systems with vacuum boosters, making it more user-friendly as electrical components are also rectangular. The connection element 1 is arranged laterally here in order to optimise the installation length, but can also be arranged on the front side, see FIG. 7. In this way the installation space for the electrical components can be optimally put to use.

Figure 4:
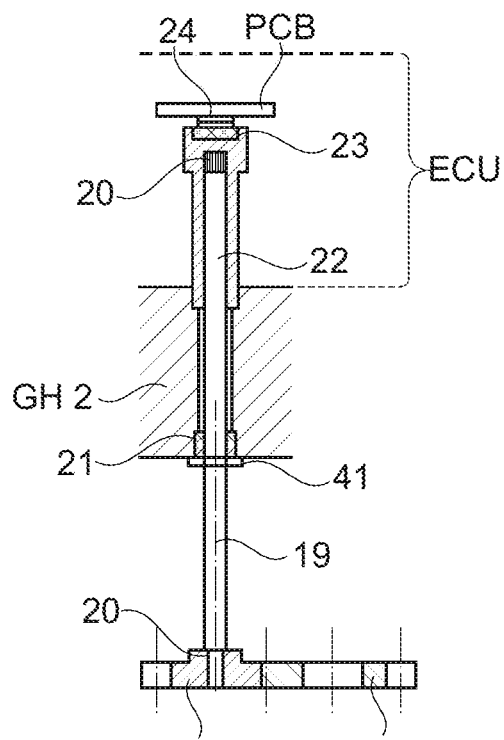
FIG. 4 shows a motor sensor drive.

FIG. 4 shows the drive of the motor rotation sensor shown in FIG. 2. The pinion gear drive is connected to the back (output of the motor) or the inner side of the rotor. Preferably, the pinion gear 17 is made of plastic and helically geared for reasons of noise reduction. This pinion gear 17 is in engagement with an output pinion gear which is pressed on a locking device 20 e.g. knurled screw of a shaft 19. The shaft is preferably mounted in a bearing bush 21 in the second housing 21. The large length from the bearing to the gear 20 is elastically bent so that the gear 17 runs without play. The opposite bearing is formed from plastic through the target intake, which forms the bearing at one end in the second housing and receives the target (solenoid) at the other end. This has an effect on the sensor element, e.g. Hall element, which sits on the printed circuit board PCB.

Figure 5:
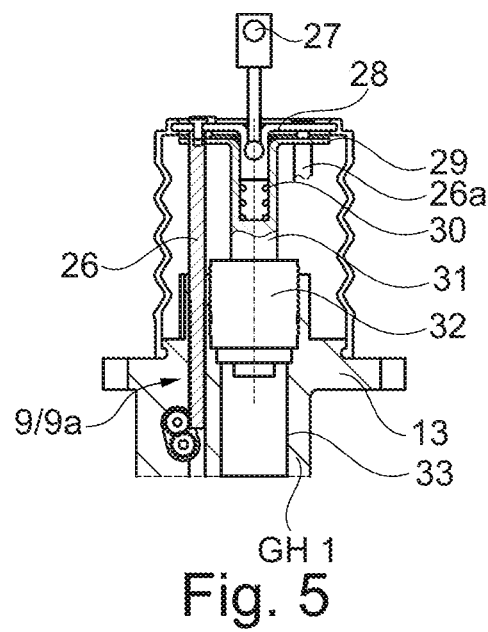
FIG. 5 shows a pedal stroke sensor drive.

FIG. 5 shows the actuation of the pedal stroke sensors. For safety reasons two pedal stroke sensors are used, which measure pedal force via a spring element—also see the applicant's DE 10 2011 101 655, in which reference to this is made. Thus, a pedal tappet is coupled to one of the pedal plates 28 with piston 31 which acts on a spring element 20. This acts on the piston 31 for generating pressure in the THZ in the pressure chamber 33, also see the applicant's DE 10 2014 117726, in which reference to this is made. This piston 31 is connected to a piston plate 29. A pedal plate 28 is connected to the sensor actuator=gear rack 1 and the piston plate 29 to gear rack 2 for sensor actuation. Both gear racks propel a pinion gear, which is described in FIG. 5a. The first housing GH1 is integrated with the mounting flange 13 in the end wall area.

FIG. 5a shows the sensor drive for both pedal stroke sensors. Gear racks 26 and 26a act on different levels on pinion gears 34 and 34a. The connection to the sensor target largely corresponds to the motor sensor shown and described in FIG. 4. In this case as well elastically bending shafts 19a are used which are mounted in bearing bushes 21 and 21a and are connected to the sensor target 22a and with the target 23a (solenoid 1) in a rotatably secured manner. The target acts on the sensor element 24a which is eccentrically conductively fixed to the other sensor elements on the same system_PCV. The housing 35 of the control unit ECU according to the prior art contains the printed circuit board PCB with all components and the solenoid coils not shown. Because of the heat dissipation, the system circuit board PCP sits on an aluminium plate as in particular the MOSFET generates heat loss for the motor control. This can easily be transferred via the aluminium plate to the second housing via a heat conducting strip.

In contrast to FIG. 4, the shaft 22 is axially secured on both sides by an anchor ring. This allows the sensor target to be pressed to a certain distance X which is beneficial for the distance-sensitive sensor signal.

Figure 6:
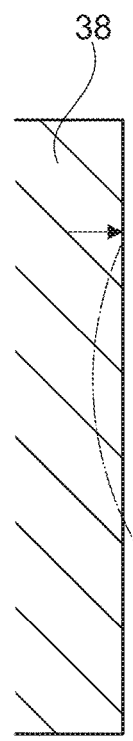
FIG. 6 shows an installation situation in the aggregate.

FIG. 6 shows in e.g. left-hand drive motor vehicles the integrated unit with the entire described individual assembly units within the dot-dashed assembly contour of the vacuum brake booster. On the right-hand side, E/E assembly units 37 are housed next to the outline contour. The distance $A_r$ shows the additional space gain, which makes up over 5 litres and is very valuable for the OEM rating and means many assemblies can be fastened more cost-effectively. On the left-hand side, predominantly aggregate units 38 are arranged, e.g. for air-conditioning systems. Here the space gain is less significant.

Figure 7:
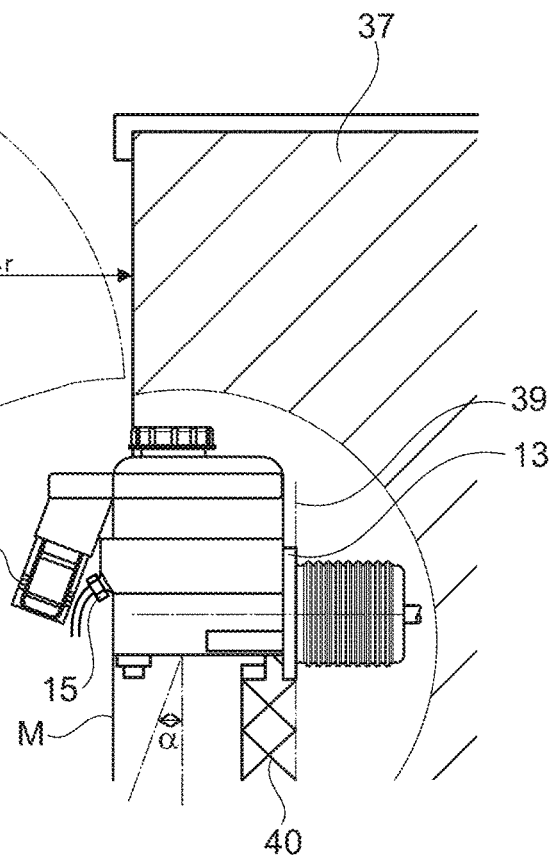
FIG. 7 shows a side view of the 1-box solution with electrical plug connector on the front side.

FIG. 7 shows the side view of the integrated unit, which in general is fitted at an angle $\alpha=15°$ with respect to the vertical axis 39 of the motor vehicle. In contract to FIG. 2, here the main plug 1 is mounted at the front, in particular on the opposite side of brake pedal and at an angle of less than 30°, in particular 15° with respect to the longitudinal axis in order to further improve the large space gain in E/E assembly units described in FIG. 6. This positioning is only possible with an extremely short assembly length of the integrated unit. The easily accessible wheel connections can also be seen.

The end wall is shown on the right-hand side. Below the flange, cables are preferably laid in the space 40, which is possible when the motor ends with the front side. Generally, the brake aggregate unit is mounted at an upward-tilting angle $\alpha$ so that there is also space gain here, see also FIG. 9.

Figure 8:
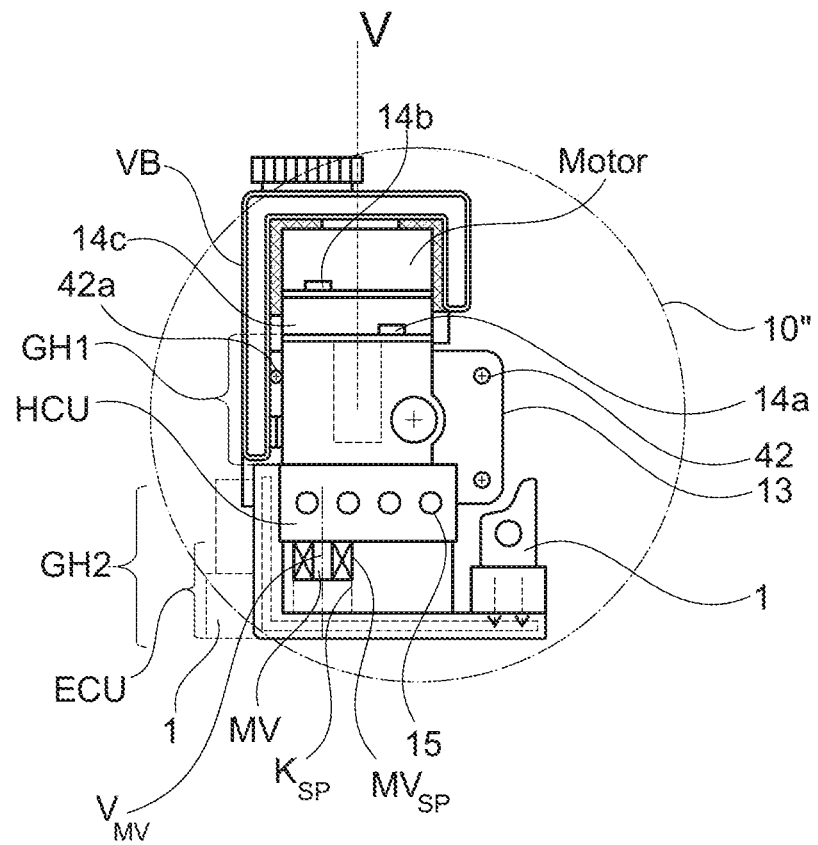
FIG. 8 shows an alternative embodiment to the embodiment shown in FIG. 2.

FIG. 8 shows a further variation of the arrangement of the motor and housing units, here tilted at an angle of 180° in comparison to FIG. 2. The motor is above and the ECU is below. This results in advantages for the design of the reservoir vessel VB which encloses the motor thereby creating space and additional sound-damping material 47 which can reduce motor noise. For this purpose, the motor housing can additionally be connected to the housing unit GH1 by means of the mount 14b connected to a sound-damping spacer 14c made from e.g. plastic via the mount 14a. A further advantage is the venting of the HCU with the MV positioned underneath and the wheel connections above.

As usual, the ECU comprises the valve coils $MV_{SP}$ and here can be perpendicularly extended and in cross-section be L-shaped or U-shaped so as to achieve a larger PCB area as the ECU area in the extremely narrow design is smaller than in the prior art. Details of the ECU structuring are described in FIG. 10.

Figure 9:
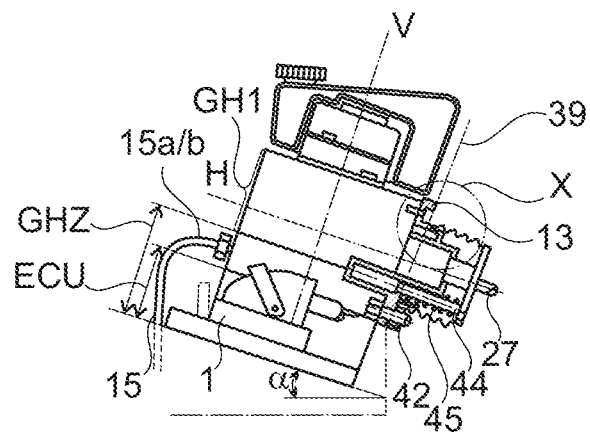
FIG. 9 shows the true installation at a tilted angle.

The housing unit GH1 is connected to the bulkhead via the flange 13, see also FIG. 9, and is accessibly rear-bolted to the right-hand side via bolts 42 from the front and left 42a. A front bolt can also be implemented by means of a corresponding housing design or design of the reservoir vessel.

FIG. 9 shows the arrangement on the bulkhead 39 at the usual tilted angle $\alpha$. The plug 1 is laterally attached, the wheel connections are at the front and very easily accessible during installation. The ECU can be extended to the wheel connections with corresponding housing design, the front part of which can bend in the event of a crash. On the opposite side, the attachment to the end wall 39 is shown. Here the plastic housing flange 13 is mounted to the housing unit GH1 with the screw 13a. This flange has a sound-damping effect on structure-borne noise and is designed to receive guide pins 44 for the pedal return spring 45. Here the flange is front-bolted to the end wall with the screw 42. The pedal tappet 27 is connected to the brake pedal, which is not shown.

Figure 9A:
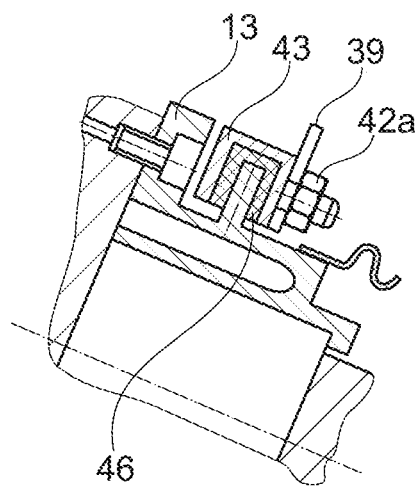
FIG. 9a shows the mounting on the end wall with noise reduction.

FIG. 9a in turn shows the flange 13 which is connected to the end wall (bullhead) via an adapter part 43 (with sound-damping element 46) e.g. spec. Elastomer via the fixing screw (rear-bolted). Essentially the bearing of the motor and KGT, here the first sound damping with part 14c, and the valve switching when the armature meets the valve seat or stop produce structure-borne noise. Here 13 and 46 act as sound damping and are accessible for the motor and KGT also.

Figure 10:
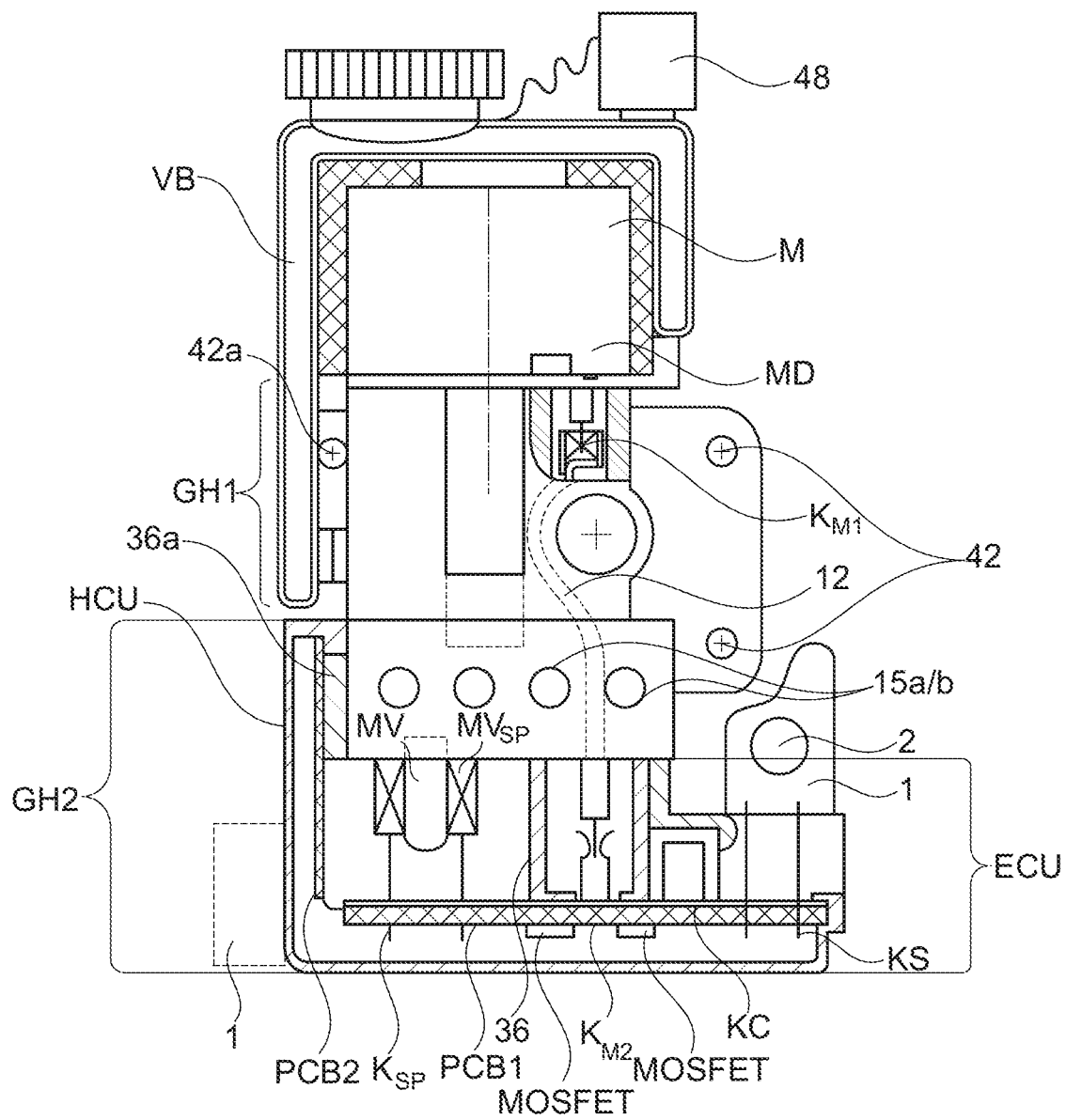
FIG. 10 shows the structure of the ECU with contacting.

FIG. 10 shows the structuring of the ECU with the electrical connections. The plug 1 is shown on the right which connects the ECU to the electrical system (power supply, bus, sensors, etc.). This can be arranged on the right or on the left. If the plug is not plugged in for e.g. repair purposes, the contacts are unprotected which in e.g. the motor compartment is unfavourable e.g. when water penetrates. Due to the short design, the aggregate unit is arranged underneath the vehicle body parts like a rain gutter. Additionally, a plug protection valve 48 can be mounted e.g. on the reservoir vessel, which can be inserted when the plug is removed. In addition, the monitoring circuitry can detect a defective plug seal when the penetrating water changes the insulation paths.

The motor control system is preferably arranged close to the plug with e.g. the MOSFET, drivers, throttles and capacitors KC, so as to make the conductor paths short and to avoid additional power rails on the PCB. The contacting on the motor KM2 is also in this area. The heat generated during operation is dissipated via a heat conductor to the valve block of the HCU and housing unit 1. Here a large heat capacity is provided to absorb the heat from short-term operation of the motor and the valve control. The motor plug can be designed to be very short if a second contacting KM2 with adaptor 12 is used.

As already mentioned in FIG. 8, the PCB area can be expanded by means of a bent circuit board e.g. Starflex principle, so that there are two parts PCB1 and PCB2. In the case of PCB2, a heat conductor 36a for heat dissipation of the components can be mounted in the HCU housing or on the RCB 2, e.g. for heat dissipation from the microcontroller to the valve block. This lowers the operating temperature, which results in lower outage rates.

The PCB1 is preferably mounted on an aluminium plate which provides good heat dissipation to the heat conductor 36. The solenoid coils Msp, motor contact holder KM2 and e.g. capacitors are contacted with the PCB1, wherein predominantly press-in contacts are used.

LIST OF REFERENCE NUMERALS

1 Connection element (main plug)
2 Wiring harness

3 Sensor element for pedal stroke
3a Actuation Target for pedal stroke sensor
4 Sensor element for motor rotation
4a Actuation Target for motor stroke sensor
5 Sensor element for fill level
5a Target for fill level sensor
6 Float in the reservoir
7 Expanded motor housing
8 Electrode
9 Drive for target actuation of the motor encoder in front of the motor rotor
9a Drive for target actuation of the motor encoder behind the motor rotor
10 THZ piston
11 Pump or pump piston
12 el. Connection element to the motor with a plurality of wires
13 Flange for fastening to the end wall
13a Fastening screw
14 a/b motor mount
14c Spacer
15a/b Hydraulic connection to the wheel brake
16 Connection to the pump suction valve
17 Pinion gear drive
18 Pinion gear drive
19 Shaft 1
19a/b Shaft 2 and 3
20 Locking device (knurled)
21 Bearing bush
21a Bearing bush
22 Target intake
22a Target intake
23 Target (solenoid)
23a Target (solenoid)
24 Sensor element
24a Sensor element
25 Printed circuit board PCB
26 Gear rack 1
26a Gear rack 2
27 Pedal tappet
28 Pedal plate
29 Piston plate
30 Force measurement spring
31 Piston
32 Sealing bush and bearing bush
33 Pressure chamber for pistons
34 Gearwheel 1
34a Gearwheel 2
35 ECU housing
36 Heat conductor
36a Heat conductor
37 E/E assembly units
38 Aggregate units for e.g. air-conditioning systems
39 Bulkhead
40 Cable space
41 Anchor ring
42 Front-bolted
42a Rear-bolted
43 Adapter part to bulkhead
44 Guide pins
45 Return spring
46 Sound-damping element
47 Material
48 Plug protection
49 Motor mount
GH1 First housing unit
GH2 Second housing unit
VB Reservoir vessel
PI Pedal interface
MV Solenoid valve
LL Left-hand drive
RL Right-hand drive
PCB Printed Circuit Board
$MV_{SP}$ Solenoid valve coil
$K_{SP}$ Contact with coil
$K_{M1}$ Motor contact 1
$K_{M2}$ Motor contact 2 with support
KS Plug contact
KC Contact with capacitor
A1 Longitudinal axis of the piston-cylinder unit or the master cylinder 10
A2 Longitudinal axis of the piston pump or the double-stroke piston pump of the pressure supply device 11

The invention claimed is:

1. An actuating device for a motor vehicle brake, comprising the following components:
    an actuating apparatus,
    a pressure-supply device configured to be driven by an electromotive drive, and which is in the form of a piston pump or a double-stroke piston pump,
    a piston-cylinder unit configured to be actuated by the actuating apparatus and hydraulically connected to a pressure medium reservoir vessel, and which forms at least two pressure spaces which are connected to hydraulic brake circuits,
    a valve arrangement having valves arranged for wheel-specific adjustment of brake pressures and for disconnecting or connecting the wheel brakes to or from the pressure supply device and/or the piston-cylinder unit, and
    an electronic control unit (ECU),
    wherein a longitudinal axis of the piston-cylinder unit and a longitudinal axis of the piston pump or double-stroke piston pump of the pressure supply unit are arranged transversely with respect to one another,
    wherein the piston-cylinder unit and the pressure supply unit are arranged in a first housing and the valves of the valve arrangement are contained within a second housing, wherein the electromotive drive, the first housing, the second housing and the electronic control unit are arranged stacked one on top of the other, in a stacking direction, to form a stack, and
    wherein the longitudinal axis of the piston-cylinder unit is arranged transversely with respect to the stacking direction and the longitudinal axis of the pressure supply device is arranged parallel to the stacking direction, wherein the stacking direction is arranged vertically or at an angle of 5° to 30° with respect to vertical.

2. The actuating device according to claim 1, wherein the electromotive drive is arranged below the first housing and the second housing is arranged above the first housing, wherein the electronic control unit is arranged above the second housing.

3. The actuating device according to claim 1, wherein the electromotive drive is arranged above the first housing and the second housing is arranged below the first housing, wherein the electronic control unit is arranged below the second housing.

4. The actuating device according to claim 1, wherein a part of the electronic control unit is arranged laterally next to the pressure supply device, the piston-cylinder unit and/or the second housing.

5. The actuating device according to claim 1, wherein housings in which the piston-cylinder unit, the pressure supply unit, the valves in the valve arrangement and the electronic control unit are arranged together to have a height that is 2 to 4 times as large as a width of the housings.

6. The actuating device according to claim 5, wherein at least a subset of the housings in which the piston-cylinder unit, the pressure supply unit, the valves in the valve arrangement and the electronic control unit together form a level side wall that is arranged facing parallel to at least one electronic component of the vehicle.

7. The actuating device according to claim 1 wherein the housings in which the piston-cylinder unit, the pressure supply unit, the valves in the valve arrangement and the electronic control unit together in cross-section comprise a substantially rectangular form, wherein cross-sectional plane defining the cross-section runs parallel to a level of a bulkhead of a motor compartment of the motor vehicle.

8. The actuating device according to claim 1, wherein the piston pump or double-stroke piston pump of the pressure supply device extends out from the first housing into the second housing.

9. The actuating device according to claim 8, wherein at least certain magnet valves in the valve arrangement are arranged laterally next to an end area of the piston pump or double-stroke piston pump of the pressure supply device.

10. The actuating device according to claim 1, wherein axes of at least certain or all solenoid valve armatures in the valve arrangement are arranged parallel to or at an angle of less than 45° with respect to the stacking direction.

11. The actuating device according to claim 1, wherein a housing of the electronic control unit in cross-section is rectangular, L-shaped or U-shaped.

12. The actuating device according to claim 1, wherein the pressure medium reservoir vessel is arranged either completely above, completely next to or above and laterally next to the stack.

13. The actuating device according to claim 1, wherein coils of certain or all solenoid valves in the valve arrangement are arranged in the electronic control unit, wherein armatures of the associated solenoid valves in the valve arrangement are comprised of the coils.

14. The actuating device according to claim 1, wherein further solenoid valves and pressure sensors are arranged in the second housing unit.

15. The actuating device according to claim 1, wherein the electronic control unit is arranged in a further housing unit that sits directly on the second housing unit and is connected to the second housing unit.

16. The actuating device according to claim 1, wherein the pressure medium reservoir vessel is mounted laterally next to the first housing unit and the second housing unit, as well as the electronic control unit, and is connected with a suction inlet of the pressure supply unit.

17. The actuating device according to claim 1, wherein a mounting flange to mount the actuating device to an end wall of a vehicle is provided on the first housing unit.

18. The actuating device according to claim 17, wherein a part made from noise-reducing material elements is arranged between a part of the actuating device and the flange.

19. The actuating device according to claim 17, wherein the flange is connected to a bulkhead of the vehicle by means of an adapter part and a sound-damping element.

20. The actuating device according to claim 1, wherein a screw connection is screwed from a front or a side and the other sides are screwed behind.

21. The actuating device according to claim 1, wherein at least sensor evaluation elements of pedal stroke sensors are arranged in and connected to the electronic control unit, and wherein at least one sensor target, in the form of a solenoid, is arranged <5 mm away from a sensor evaluation element.

22. The actuating device according to claim 1, wherein sensor actuations of pedal stroke sensors are arranged in the first or second housing unit, and movement of a brake pedal and a motor rotor is transmitted to a target, and wherein an evaluation element of the pedal stroke sensors is arranged on a printed circuit board in the electronic control unit.

23. The actuating device according to claim 1, wherein the electronic control unit is configured to evaluate a signal of a leakage sensor, which is formed by an electrode or comprises an electrode.

24. The actuating device according to claim 1, wherein a sensor configured to measure fluid level in the pressure medium reservoir vessel is connected to a printed circuit board.

25. The actuating device according to claim 1, wherein a connection element to connect to an electrical system of the vehicle is mounted laterally next to the electronic control unit or on a front side of the electronic control unit.

26. The actuating device according to claim 1, wherein connections for hydraulic connection to the wheel brakes are arranged on a front side of the second housing unit.

27. The actuating device according to claim 1, wherein actuation of a sensor target is performed via a rack and pinion.

28. The actuating device according to claim 1, wherein redundant pedal stroke sensors are actuated by means of gear racks which are connected to a brake pedal or a piston plate.

29. The actuating device according to claim 1, wherein a motor housing, a housing of the valve arrangement, or the first housing unit comprises an extension in order to catch leakage fluid, wherein a sensor to sense the leakage fluid is provided in the extension.

30. The actuating device according to claim 1, wherein the first and the second housing units are made of various materials, wherein the material of the first housing unit has good bearing properties and the material of the second housing unit has good cold-forming properties, in order to mount a solenoid valve and a pressure sensor.

31. An actuating device for a motor vehicle brake, comprising the following components:
   an actuating apparatus,
   a pressure-supply device configured to be driven by an electromotive drive, and which is in the form of a piston pump or a double-stroke piston pump,
   a piston-cylinder unit configured to be actuated by the actuating apparatus and hydraulically connected to a pressure medium reservoir vessel, and which forms at least two pressure spaces which are connected to hydraulic brake circuits,
   a valve arrangement having valves arranged for wheel-specific adjustment of brake pressures and for disconnecting or connecting the wheel brakes to or from the pressure supply device and/or the piston-cylinder unit, and
   an electronic control unit (ECU),
wherein a longitudinal axis of the piston-cylinder unit and a longitudinal axis of the piston pump or double-stroke piston pump of the pressure supply unit are arranged transversely with respect to one another,
wherein the piston-cylinder unit and the pressure supply unit are arranged in a first housing, wherein the electromotive drive, the first housing, the valve arrangement and the electronic control unit are arranged stacked one on top of the other, in a stacking direction, to form a stack, and wherein the longitudinal axis of the piston-cylinder unit is arranged transversely with respect to the stacking direction and the longitudinal axis of the pressure supply device is arranged parallel to the stacking direction, wherein the stacking direction is arranged vertically or at an angle of 5° to 30° with respect to vertical, wherein actuation of a sensor target is performed via a rack and pinion, and wherein a play adjustor is provided on the rack and pinion, which comprises an elastic shaft.

* * * * *